United States Patent
Hammer et al.

(10) Patent No.: US 10,821,933 B2
(45) Date of Patent: Nov. 3, 2020

(54) DEFORMABLE AUTOMOTIVE NOISE AND VIBRATION SEAL FOR PEDESTRIAN PROTECTION

(71) Applicant: TOYOTA MOTOR ENGINEERING & MANUFACTURING NORTH AMERICA, INC., Plano, TX (US)

(72) Inventors: Jeremiah T. Hammer, Ann Arbor, MI (US); Troy N. Grantham, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 10 days.

(21) Appl. No.: 16/262,851

(22) Filed: Jan. 30, 2019

(65) Prior Publication Data
US 2020/0238946 A1   Jul. 30, 2020

(51) Int. Cl.
*B60R 21/34* (2011.01)
*B60J 5/02* (2006.01)

(52) U.S. Cl.
CPC ............... *B60R 21/34* (2013.01); *B60J 5/02* (2013.01); *B60R 2021/343* (2013.01)

(58) Field of Classification Search
CPC .................................................... B60R 21/34
USPC ................................................... 296/193.11
See application file for complete search history.

(56) References Cited

U.S. PATENT DOCUMENTS

| | | | |
|---|---|---|---|
| 7,270,367 B2 | 9/2007 | Mairing | |
| 7,469,955 B2* | 12/2008 | Patterson | B62D 25/12 296/187.03 |
| 7,690,722 B2* | 4/2010 | Boggess | B60R 21/34 296/187.04 |
| 8,616,622 B2* | 12/2013 | Davis | B60R 21/34 180/69.2 |
| 8,702,155 B2 | 4/2014 | Suzuki | |
| 8,807,637 B2 | 8/2014 | Partsch et al. | |
| 9,272,735 B2* | 3/2016 | Iwano | B62D 25/10 |
| 9,855,914 B1 | 1/2018 | Hammer et al. | |
| 9,963,917 B2* | 5/2018 | Reyes Luna | E05F 5/022 |
| 2006/0237998 A1* | 10/2006 | Andre | B60R 21/34 296/193.11 |
| 2009/0169335 A1* | 7/2009 | Yuta | F16B 19/008 411/431 |

(Continued)

FOREIGN PATENT DOCUMENTS

WO   2010081949 A1   7/2010

*Primary Examiner* — Joseph D. Pape
(74) *Attorney, Agent, or Firm* — Haynes and Boone, LLP

(57) ABSTRACT

A system for noise and vibration sealing of a vehicle while providing reduced impact resistance includes a block of compressible material positionable between a vehicle hood and a support structure of the vehicle. The block of compressible material may include an attachment surface configured to be secured to a portion of the vehicle and an impact surface formed opposite the attachment surface. The impact surface may be positioned in the vehicle to be contacted by the hood or support structure during an impact event. An exterior surface may extend between the attachment surface and the impact surface. A cavity may be formed in the exterior surface. The cavity may have a first inner surface and a second inner surface opposing the first inner surface, and may be shaped to accommodate crushing of the block of compressible material during the impact event.

20 Claims, 14 Drawing Sheets

(56) References Cited

U.S. PATENT DOCUMENTS

2018/0281871 A1 10/2018 Yamamoto

* cited by examiner

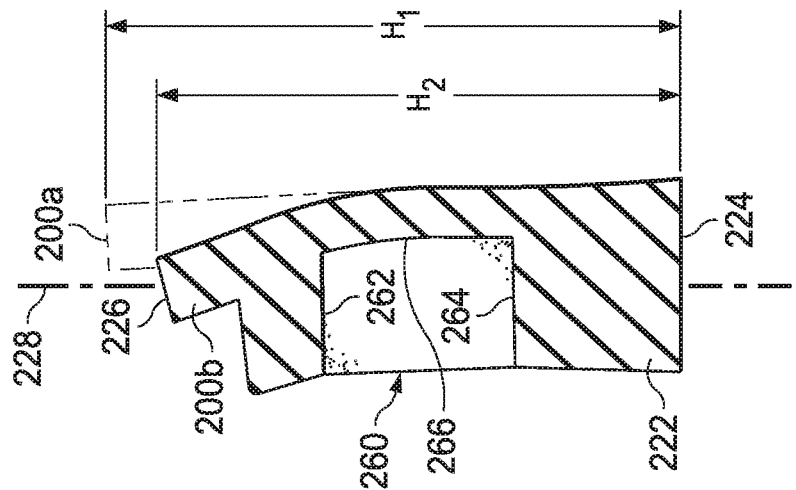
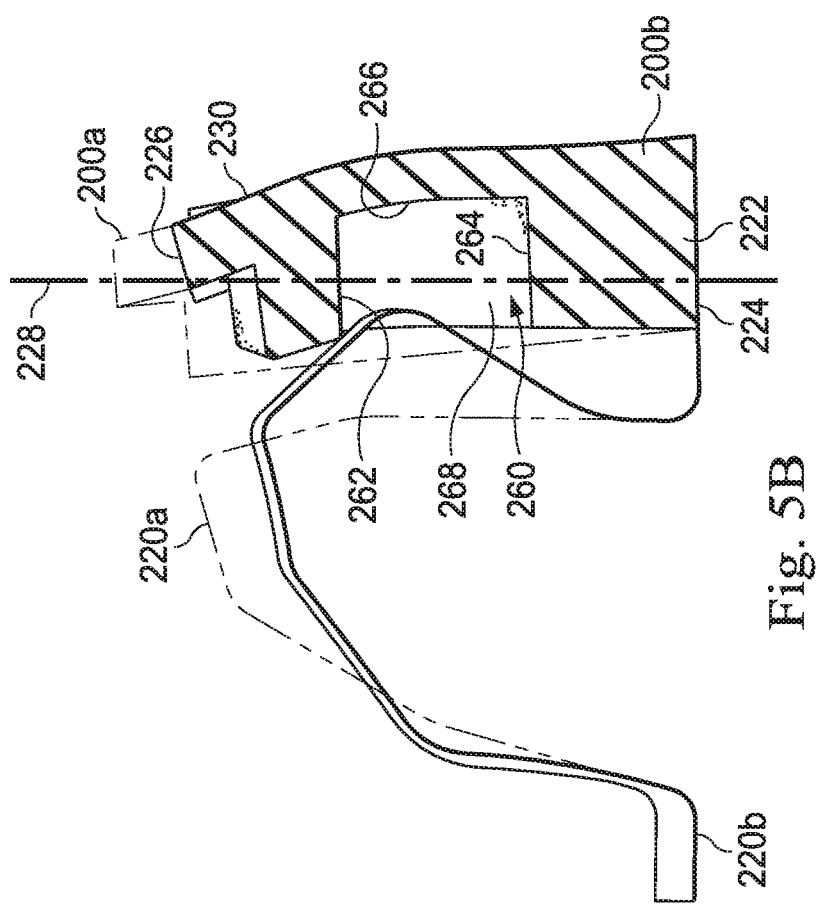

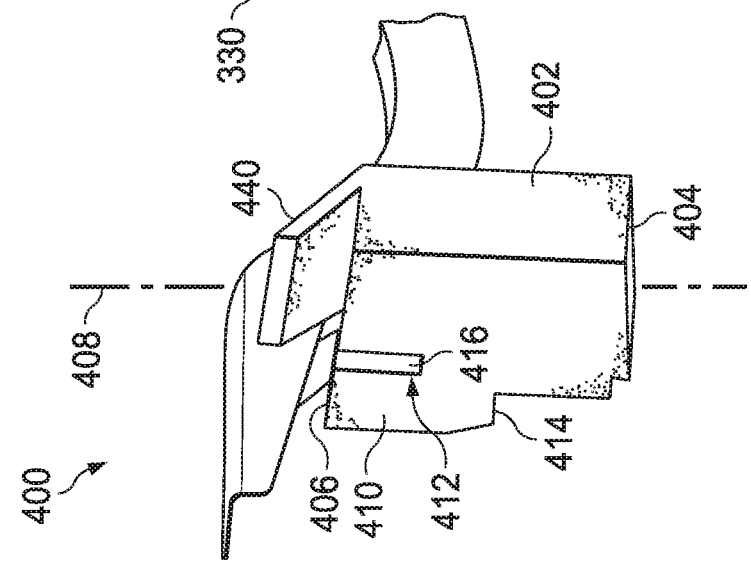
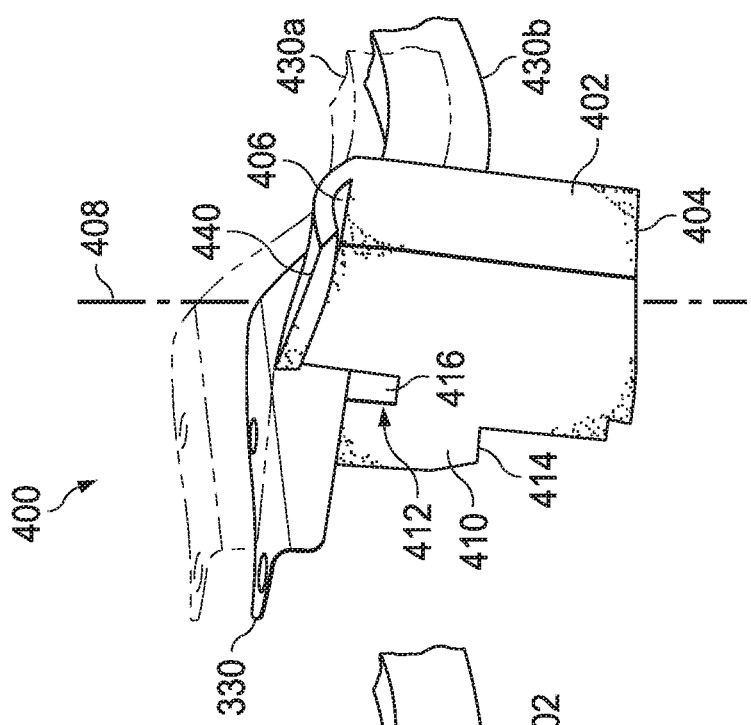
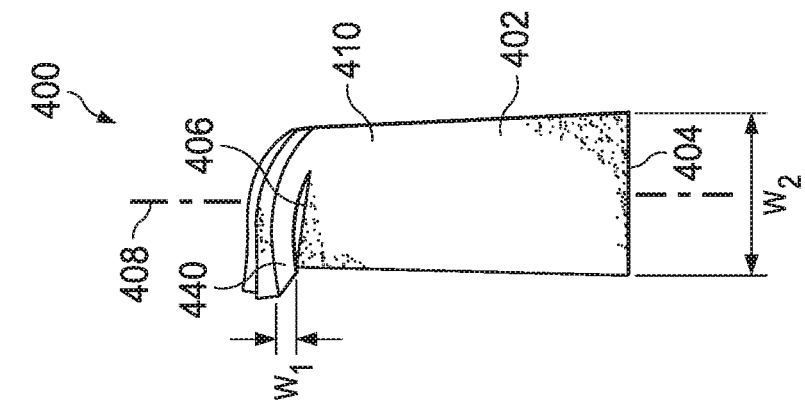

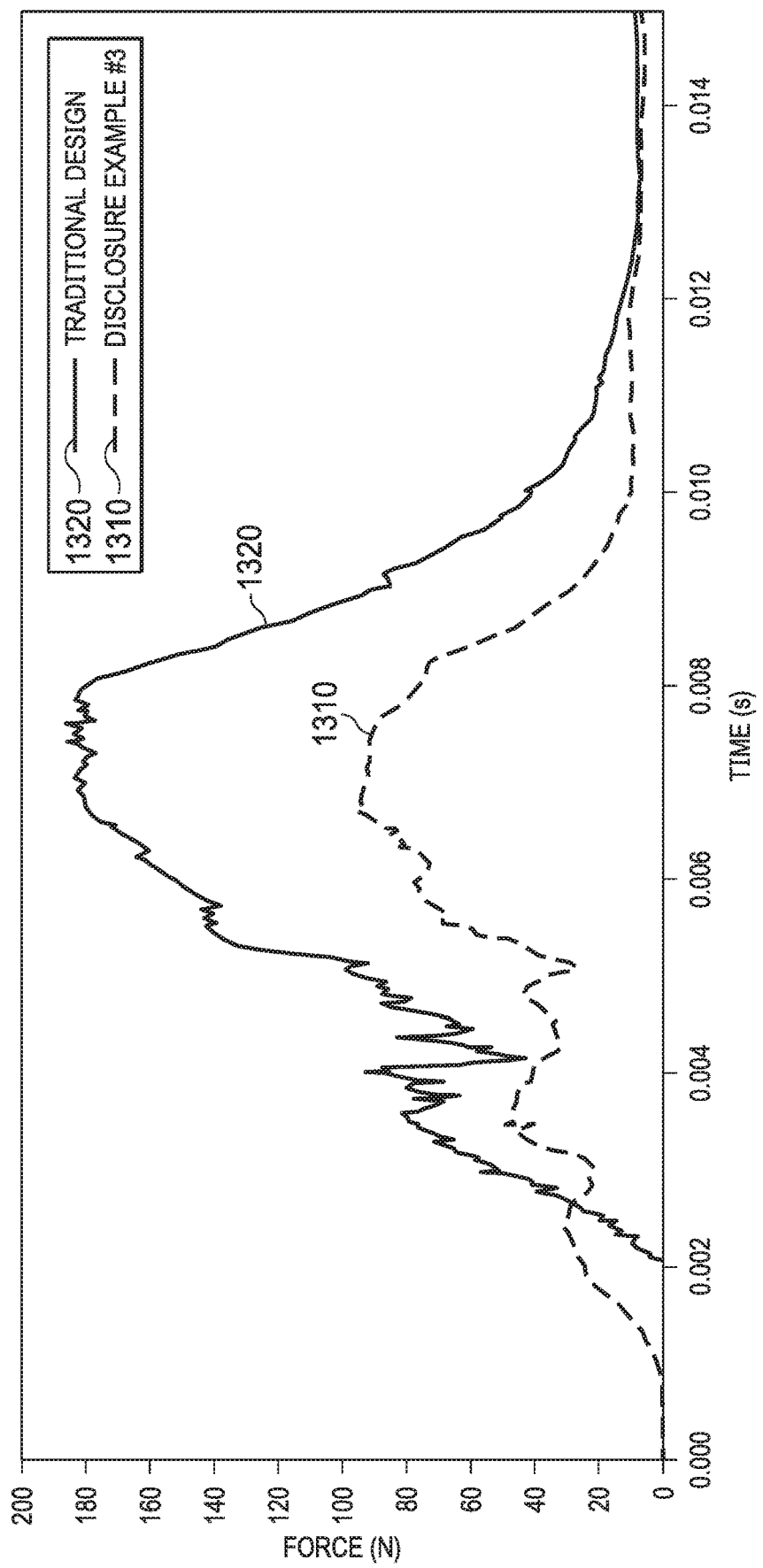

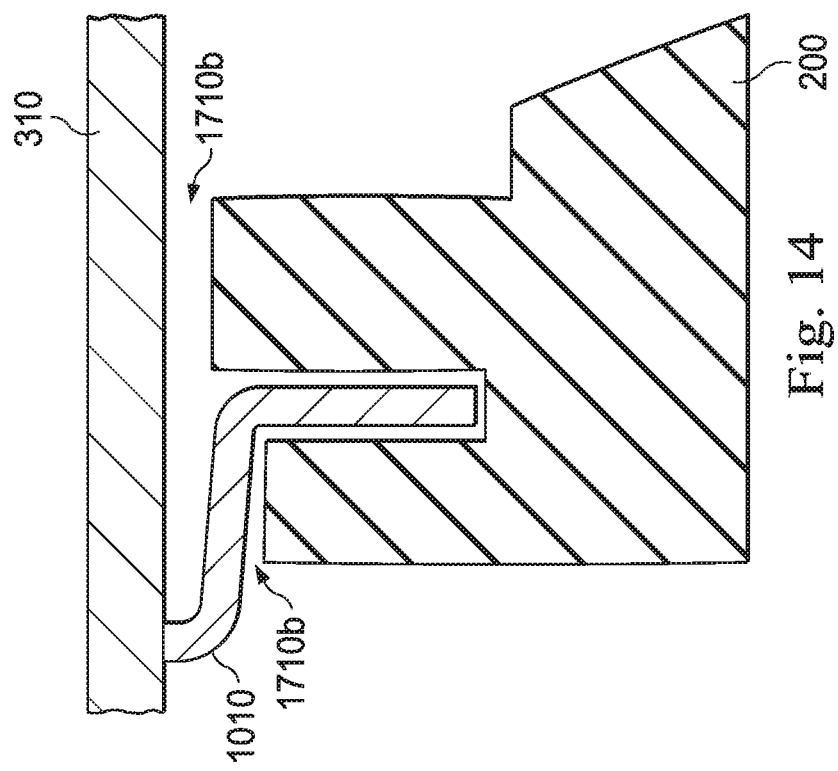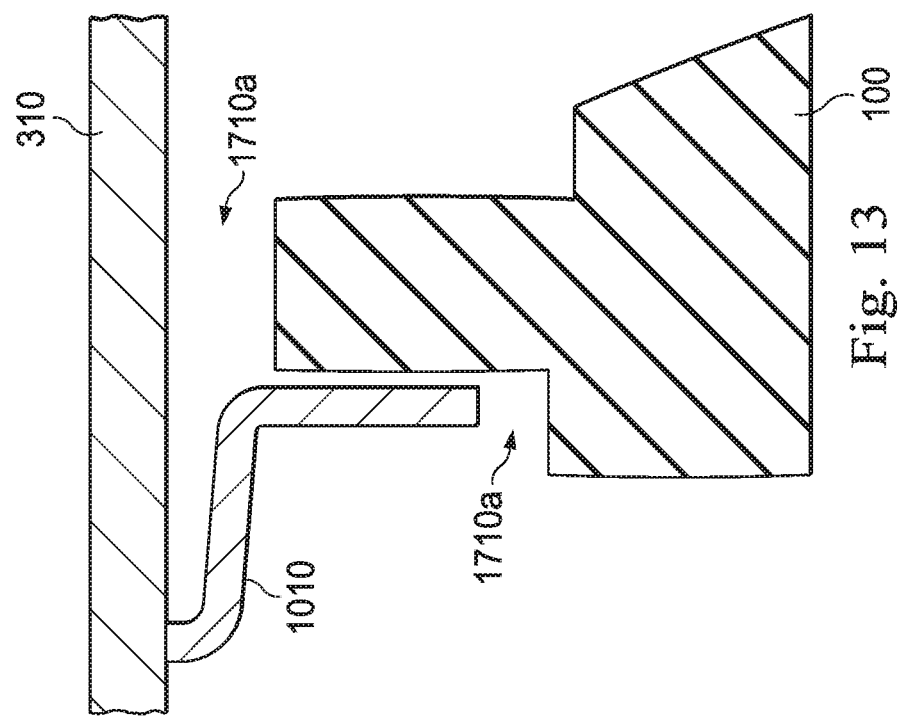

DEFORMABLE AUTOMOTIVE NOISE AND VIBRATION SEAL FOR PEDESTRIAN PROTECTION

TECHNICAL FIELD

The subject matter described herein relates to methods and devices for sealing automotive engine compartments against the release of noise and vibration, while maintaining a relatively low resistance to crushing or deformation.

BACKGROUND

Noise and vibration (NV) sealing of the engine compartments of automobiles helps reduce engine noise and wind noise that can be heard in the cabin interior. In recent vehicle designs, manufacturers are prioritizing the reduction of engine noise and wind noise to produce higher satisfaction for their customers. Specifically located sealing components function to block air from escaping the engine compartment of the vehicle, prevent unwanted engine noise from reaching the driver, and preventing the hot air from under the vehicle hood from escaping and joining the fast-moving air during driving.

However, conventional NV seals may be ripe for improvement. For example, during a pedestrian impact, the pedestrian's head may crush the hood enough to contact one of these sealing components. Since these sealing components are stiff (e.g., closed cell foam), the pedestrian's head can experience high accelerations if it contacts the hood during the pedestrian impact. Automobiles may incorporate deforming metal components designed to absorb or dissipate energy and provide a "soft-ish" impact during a pedestrian collision, thereby making parts such as the hood relatively compliant. However, the presence of a stiff foam component may interfere with this compliance.

Pedestrian head injury is quantified by the head injury criterion (HIC) which correlates to skull fracture and brain injury. HIC, a function of time and acceleration of the head during the impact, is given by:

$$HIC = \left\{ \left[ \frac{1}{t_2 - t_1} \int_{t_1}^{t_2} a(t) dt \right]^{2.5} (t_2 - t_1) \right\}_{max}$$

The systems, devices, and methods described herein may address one or more shortcomings of conventional systems.

SUMMARY

Disclosed is an engine compartment noise and vibration (NV) sealing block. In some implementations, the NV sealing block comprises a system for noise and vibration sealing of a vehicle with low impact resistance, comprising: a block of compressible material positionable between a vehicle hood and a support structure of the vehicle, the block of compressible material comprising: an attachment surface configured to be secured to a portion of the vehicle, an impact surface formed opposite the attachment surface, the impact surface being positioned in the vehicle to be contacted by the hood or support structure during an impact event, an exterior surface extending between the attachment surface and the impact surface, and a cavity formed in the exterior surface, the cavity having a first inner surface and a second inner surface opposing the first inner surface, the cavity being shaped to accommodate crushing of the block of compressible material during the impact event.

In some implementations, the NV sealing block comprises a vehicle support bracket disposed adjacent the block of compressible material, the vehicle support bracket being configured to deform in a lateral direction during the impact event, the support bracket being disposed to enter the cavity during the impact event. In some implementations, the NV sealing block comprises a flap extending from the impact surface and being configured to interface with one of the hood and the support structure of the vehicle to reduce wind flow through the vehicle. In some implementations, the cavity is formed by the first inner surface, the second inner surface, and at least one lateral side surface. In some implementations the cavity is disposed by formed by the first inner surface the second inner surface, and at least two lateral side surfaces. In some implementations, the cavity is a first cavity and comprises an opening, and wherein the block comprises a second cavity formed in the exterior surface, the second cavity having an opening facing away from the opening of the first cavity.

In some implementations, the second cavity is disposed above the first cavity when the block is disposed on the vehicle. In some implementations, the cavity has width greater than or equal to half a width of the block. In some implementations, the system comprises a vertically extending slot shaped to accommodate a hinge of a hood. In some implementations, the cavity is formed between substantially parallel arms configured to collapse during the impact event.

In some implementations, the NV sealing block comprises a system for noise and vibration sealing of a vehicle, comprising: a block of compressible material positionable between a vehicle hood and a support structure of the vehicle, the block of compressible material having a block width and a block length, comprising: an attachment surface configured to be secured to a portion of the vehicle, an impact surface formed opposite the attachment surface, the impact surface being positioned in the vehicle to be contacted by the hood or support structure during an impact event, an exterior surface extending between the attachment surface and the impact surface, and a flexible sealing flap extending from the impact surface, the sealing flap having a flap width smaller than the block width and configured to fold or bend before substantial deformation of the block during the impact event.

In some implementations, the system comprises a vertically extending slot shaped to accommodate a hinge of a hood, the vertically extending slot being adjacent the flexible sealing flap. In some embodiments, the block comprises a cavity formed in the exterior surface, the cavity having a first inner surface and a second inner surface opposing the first inner surface, the cavity being shaped to accommodate crushing of the block of compressible material during the impact event. In some implementations, the system comprises a vehicle support bracket disposed adjacent the block of compressible material, the vehicle support bracket being configured to deform in a lateral direction during the impact event, the support bracket being disposed to enter the cavity during the impact event. In some implementations, the cavity is formed by the first inner surface, the second inner surface, and at least one lateral side surface. In some implementations, the cavity is a first cavity and comprises an opening, and wherein the block comprises a second cavity formed in the exterior surface, the second cavity having an opening facing away from the opening of the first cavity. In some implementations, the block comprises a flexible back portion forming an inner wall of the cavity, the flexible back portion extending from the cavity to the exterior surface.

In some implementations, the NV sealing block provides a method of improving pedestrian impact properties of a vehicle noise and vibration seal, comprising: securing an attachment surface of a block of compressible material between a vehicle hood and a support structure of the vehicle in a location preventing air flow from between the hood and a windshield of the vehicle, the block comprising: an impact surface formed opposite the attachment surface, the impact surface being positioned in the vehicle to be contacted by the hood or support structure during an impact event, an exterior surface extending between the attachment surface and the impact surface, and a cavity formed in the exterior surface, the cavity having a first inner surface and a second inner surface opposing the first inner surface, the cavity being shaped to accommodate crushing of the block of compressible material during the impact event.

In some implementations, the method comprises: in response to an impact event on the hood, receiving a portion of a collapsing bracket into the cavity. In some implementations, the method comprises: in response to an impact event on the hood, folding a flexible sealing flap extending from the impact surface before substantial collapsing of the block due to the cavity.

The NV sealing block disclosed herein has particular, but not exclusive, utility for reducing the severity of head injuries during vehicle-pedestrian impacts while providing noise suppression for a comfortable driving experience.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the NV seal, as defined in the claims, is provided in the following written description of various embodiments of the disclosure, and is illustrated in the accompanying drawings.

BRIEF DESCRIPTION OF THE DRAWINGS

Illustrative embodiments of the present disclosure will be described with reference to the accompanying drawings, of which:

FIGS. 5A, 5B, and 5C show an example NV sealing block during an impact event, according to at least one embodiment of the present disclosure.

FIGS. 7A, 7B, and 7C show an example NV sealing block during an impact event, according to at least one embodiment of the present disclosure.

FIG. 10 is a graphical representation of the acceleration forces of a pedestrian head form during an example impact event near an NV sealing block in accordance with at least one embodiment of the present disclosure.

FIG. 13 is a diagrammatic representation of the geometry of an example NV sealing block according to the related art.

FIG. 14 is a diagrammatic representation of the geometry of an example NV sealing block according to at least one embodiment of the present disclosure.

DETAILED DESCRIPTION

Figure 1:
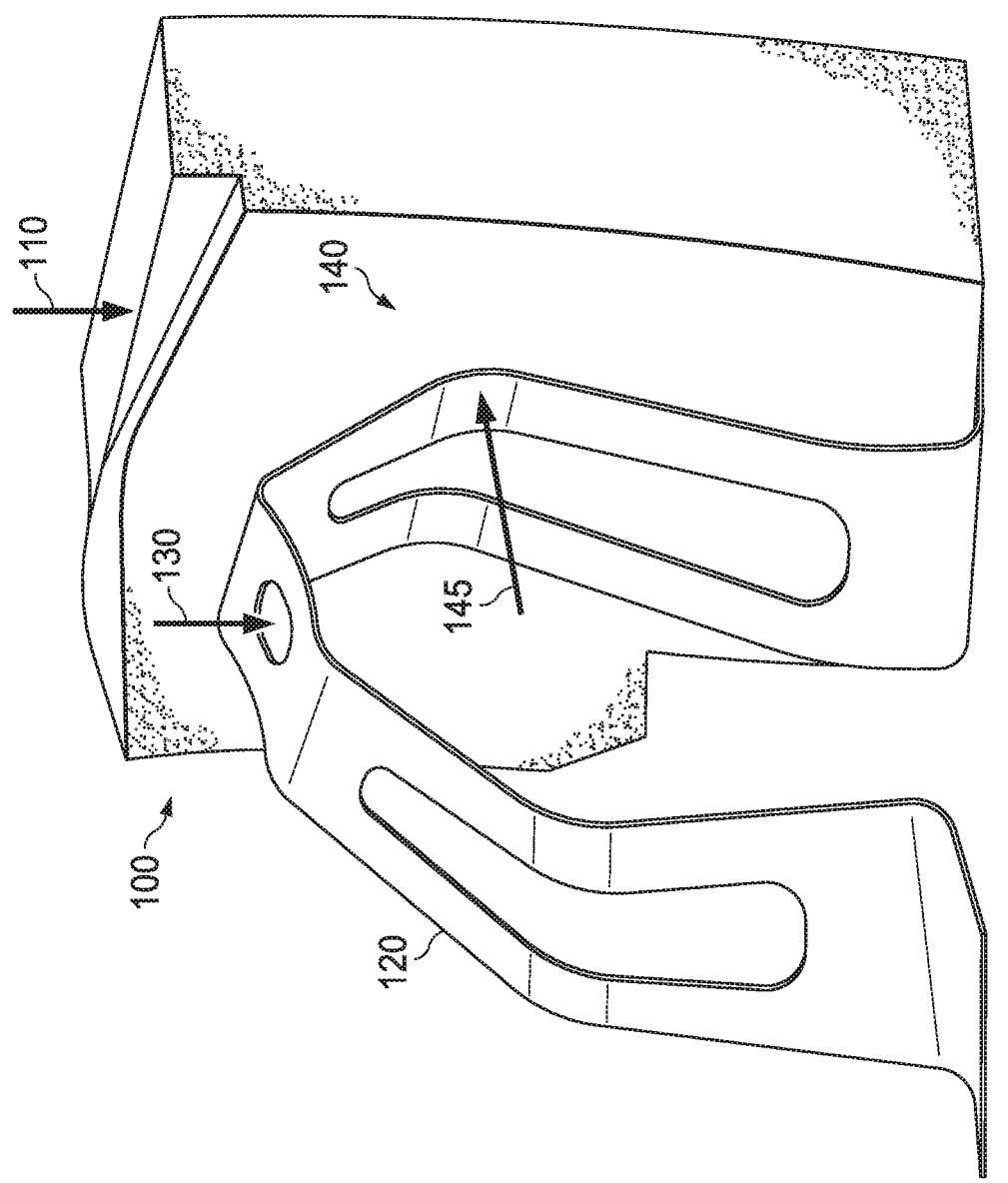
FIG. 1 is an exemplary representation of a conventional engine compartment noise and vibration (NV) sealing block and bracket.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

In accordance with at least one embodiment of the present disclosure, engine compartment noise and vibration (NV) seals, such as NV sealing blocks are provided which have improved deformation characteristics and which reduce engine noise and wind noise within the vehicle cabin. During a pedestrian to vehicle impact, the head, sometimes referred to herein as a head form, can strike the vehicle hood. To minimize the injury to the pedestrian's head, a relatively soft impact may be desirable while avoiding large accelerations during contact with under-the-hood vehicle components. The NV sealing blocks may reduce engine and wind noise by blocking air from escaping the engine compartment of the vehicle.

In some implementations, the NV seals disclosed herein maintain their sealing integrity and reduce the likelihood of injury to the head form during a pedestrian impact. When the component deforms in specific desirable ways, the acceleration of the head form is reduced and can decrease the HIC score and thus decrease pedestrian injury resulting from the impact.

The NV sealing blocks of the present disclosure are an improvement from existing sealing methods because they deform much more readily when a load is produced from above the NV sealing block. In addition, cutouts in the NV sealing block can reduce or eliminate contact with nearby components that may otherwise inhibit deformation of the NV sealing blocks (such as deformable pedestrian brackets).

FIG. 1 is an exemplary representation of a conventional engine compartment noise and vibration (NV) sealing block 100. In an example, the NV sealing block 100 is a block of semi-stiff compressible material that sits adjacent to a bracket 120. During an example impact event, the NV sealing block 100 is subject to an impact force 110 which deforms the NV sealing block 100. In an example vehicle-pedestrian collision wherein the pedestrian strikes the vehicle near the NV sealing block (e.g., near a rear corner of the vehicle's hood), such deformation may be insufficient to absorb the impact force and limit injury (e.g., head injury criterion or HIC) to the pedestrian, as will be detailed below.

In the same impact, the bracket 120 may be subject to an impact force 130 which deforms the bracket 120. This deformation may cause the bracket to expand laterally causing contact at a contact point 140 between the NV sealing block 100 and the bracket 120, through which a contact force 145 is exerted. The contact force 145 may further limit the deformation and force absorption/dissipation capability of the NV sealing block 100, thus further increasing the risk of injury to the pedestrian with whom the vehicle has collided.

Figure 2:
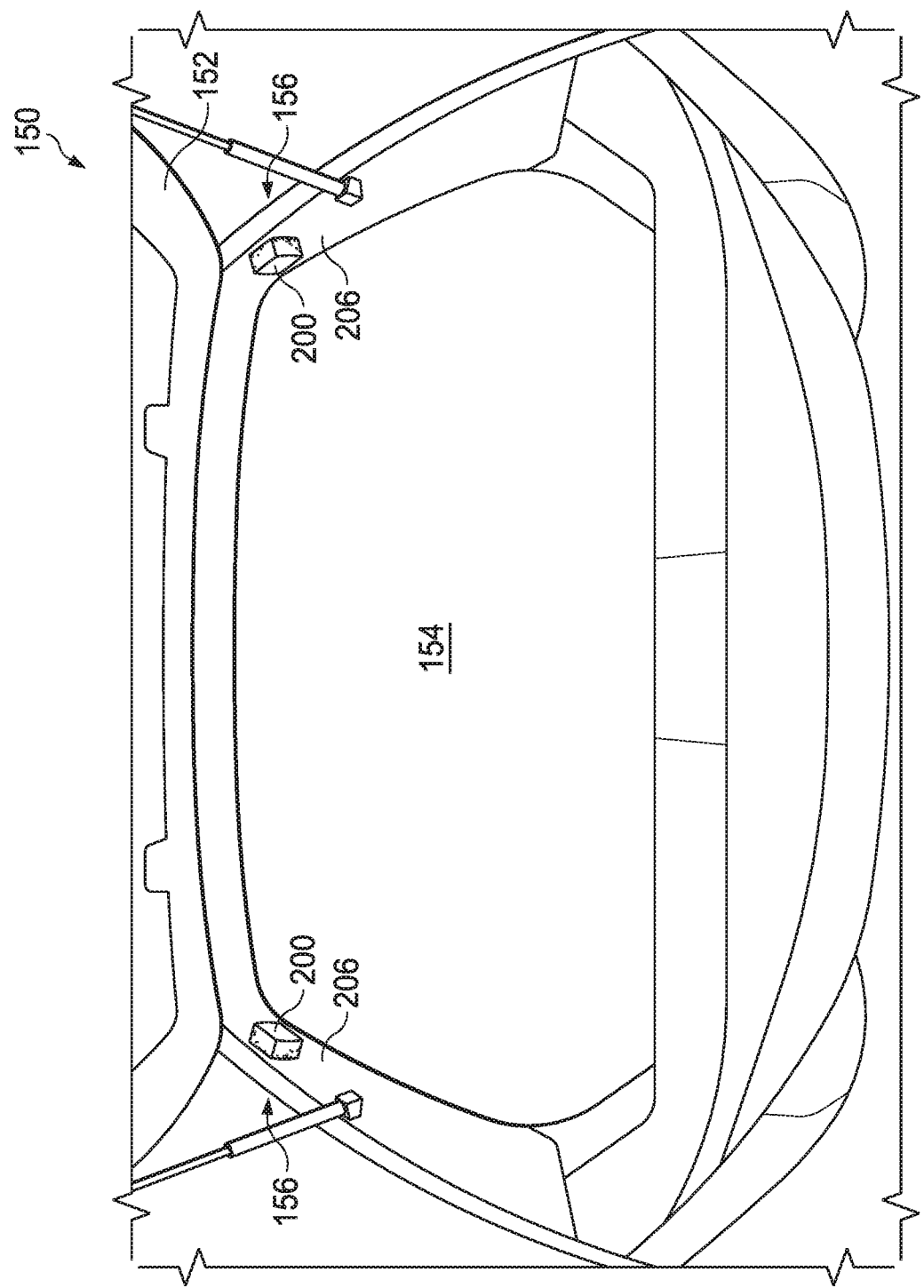
FIG. 2 is a diagrammatic representation of an example engine compartment of a vehicle with NV sealing blocks.

FIGS. 2, 3, and 5A-5C show an exemplary embodiment of an NV sealing block 200 that may have wind and noise reducing properties similar to the NV sealing block of FIG. 1, and may also include additional deformation properties allowing the NV sealing block 200 to more readily deform in an impact event. FIG. 2 is a diagrammatic representation of a vehicle 150 having a hood 152 in a raised condition showing an engine compartment 154. The engine compartment 154 is defined by supporting structure 206 surrounding the supporting structure 206, which is discussed below. The NV sealing blocks 200 are disposed in upper corners 156 of the engine compartment adjacent the windshield and under the hood 152. These NV sealing blocks 200 are disposed in what would otherwise be natural air-flow exits from the engine compartment 154 in the upper corners 156. Absent the NV sealing blocks 200 the upper corners 156, between the hood (in a closed position) and vehicle supporting structure 206, would serve as primary exit points for the engine compartment air flow. When the engine compartment air flow exits from the top rear corners 156 of the engine compartment 154, it contributes to both engine noise and wind noise as experienced by drivers and passengers within the vehicle 150. The introduction of the NV sealing blocks 200 limits flow through these exit points, preventing or reducing air flow from exiting at these locations and contributing to a reduction in engine noise and wind noise. As a result, the engine noise and wind noise experienced by drivers and passengers are both reduced.

Figure 3:
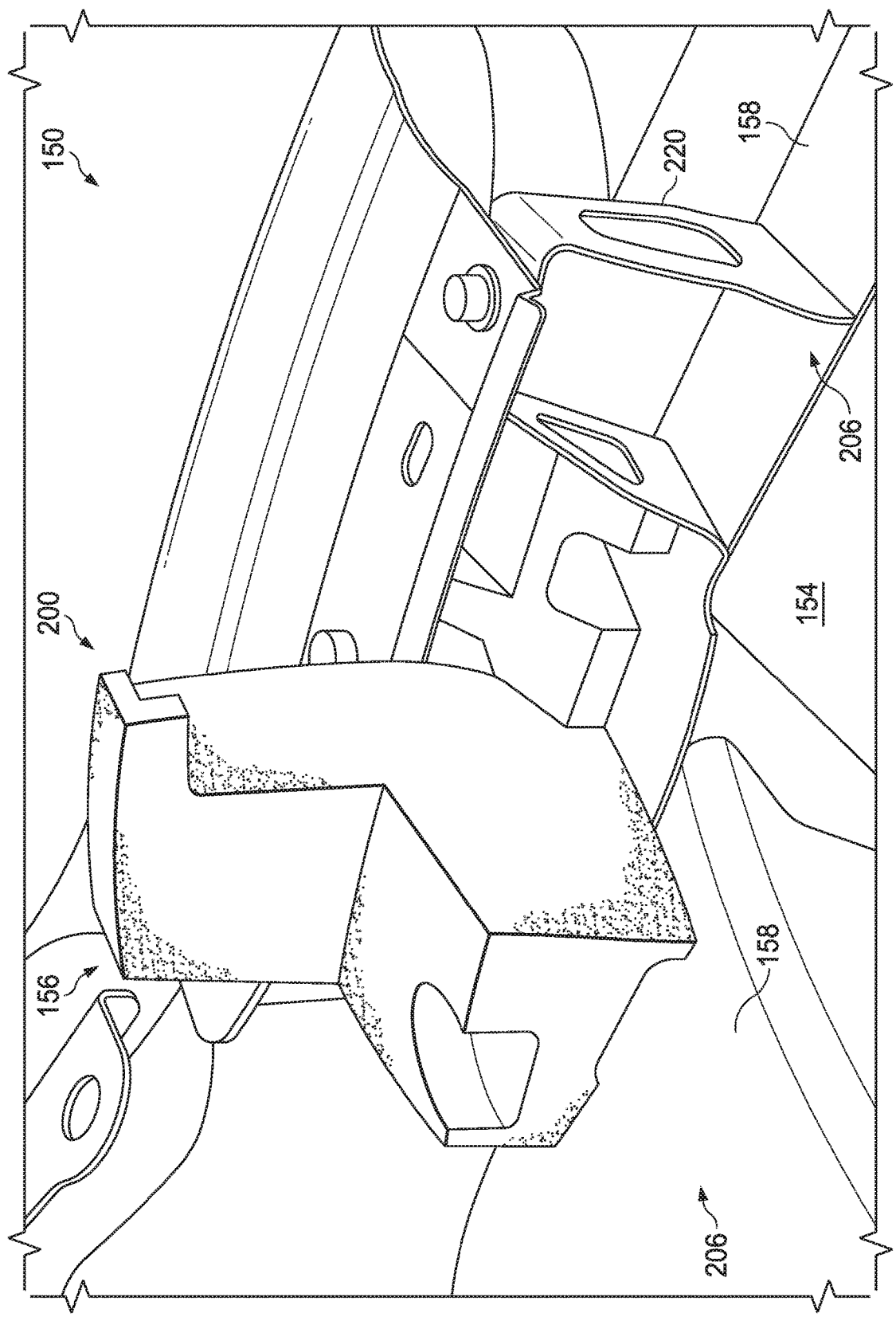
FIG. 3 is an exemplary representation of an engine compartment NV sealing block and bracket in accordance with at least one embodiment of the present disclosure.

FIG. 3 is an exemplary representation of the NV sealing block 200 according to the inventive principles and designs described herein. The NV sealing block 200 is disposed within the engine compartment 154 on the vehicle 150. In this embodiment, the NV sealing block 200 is disposed in the area between the hood of the vehicle (FIG. 2) and supporting structure 206 of the vehicle 150. The supporting structure 206 may be any structural component of the vehicle 150, and may include, for example, a vehicle frame, a fender, and engine mount, or other structure disposed about or forming a part of the engine compartment 154 of the vehicle. In some embodiments, the NV sealing block 200 is disposed in the corners 156 of the engine compartment 154 adjacent a vehicle windshield as shown in FIG. 2.

As can be seen in FIG. 3, the NV sealing block 200 is shown in proximity to an example bracket 220 within the engine compartment 154 of the vehicle 150, in accordance with at least one embodiment of the present disclosure. The NV sealing block 200 and bracket 220 are each attached to to the supporting structure 206 (such as by being bolted, fastened, clipped, or otherwise secured), which in this embodiment is a fender attachment of the engine compartment 154 and/or to the vehicle frame 158. The NV sealing block 200 limits the escape of air through the corner 156 of the engine compartment between the support structure and the vehicle's hood 152 (FIG. 2). In an example, the proximity of the NV sealing block 200 and the bracket 220 to one another means that a downward compressive force (e.g., caused by the impact of a pedestrian on the hood above these components) may deform both components sufficiently that the energy dissipation capabilities of both are impaired, and a portion of the vehicle's kinetic energy is transferred from the supporting structure, such as the frame 158, through the NV sealing block 200 and bracket 220, through the hood 152, and into a pedestrian that may be struck by the vehicle.

Figure 4:
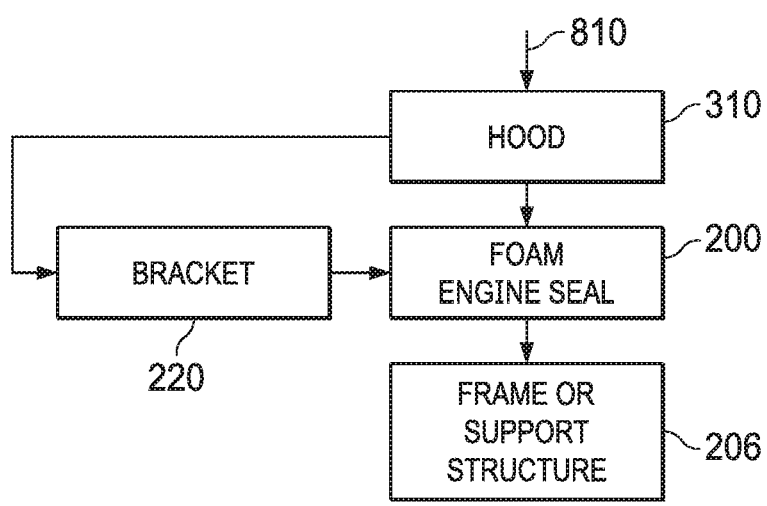
FIG. 4 is a simplified flow diagram of the load path in a pedestrian head impact near an NV sealing block in accordance with at least one embodiment of the present disclosure.

In accordance with at least one embodiment of the present disclosure, changing the shape of the NV sealing block 200 in advantageous ways (e.g., by adding one or more cutouts or cavities 260 as described herein) can prevent or limit contact between the NV sealing block 200 and the bracket 220 during an impact event, while simultaneously reducing the stiffness and increasing the compressibility of the NV sealing block 200. FIG. 4 is a simplified flow diagram of the load path in a pedestrian head impact near an NV sealing block 200 in accordance with at least one embodiment of the present disclosure. In FIG. 4, an applied force 810 to a vehicle hood 310 (which may correspond to the hood 152 in FIG. 2) causes the NV sealing block 200 (e.g., a foam block) to be crushed between the hood 310 and the vehicle support structure 206, such as the frame 158 or other supporting structure supported by the vehicle frame, with an additional lateral force input from the bracket 220 to the side. Using the principles described herein, the NV sealing block 200 may dampen or better absorb these forces in a manner that may reduce the acceleration of the pedestrian head form. To accomplish this, eliminating or reducing the contact from the fender bracket 220 by introducing accommodating cavities in the NV sealing block 200 may allow the NV sealing block 200 (e.g., a foam block) to crush more efficiently in the direction of the applied load from the hood 310.

Figure 5A:
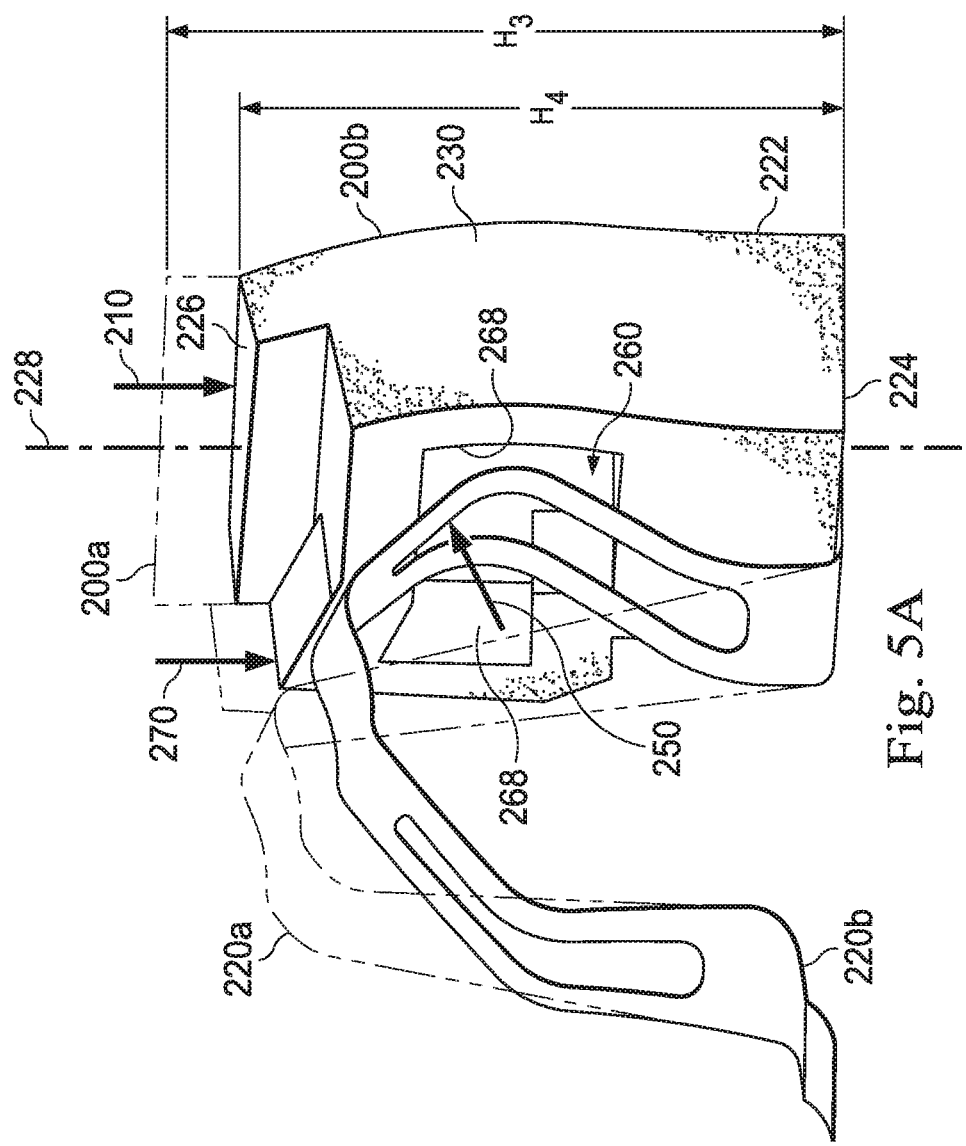
Figure 6B:
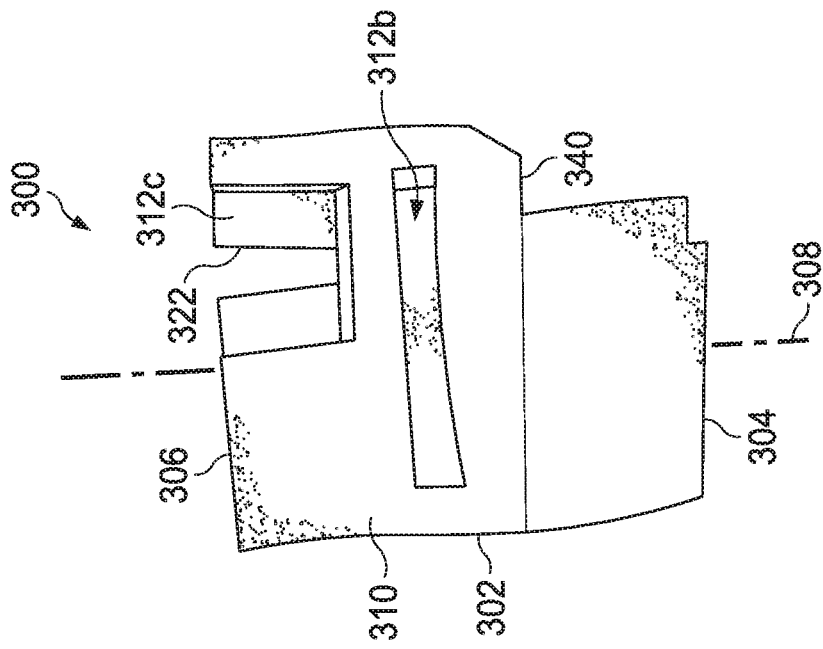
FIGS. 6A, 6B, 6C, and 6D show an example NV sealing block during an impact event, according to at least one embodiment of the present disclosure.
Figure 6A:
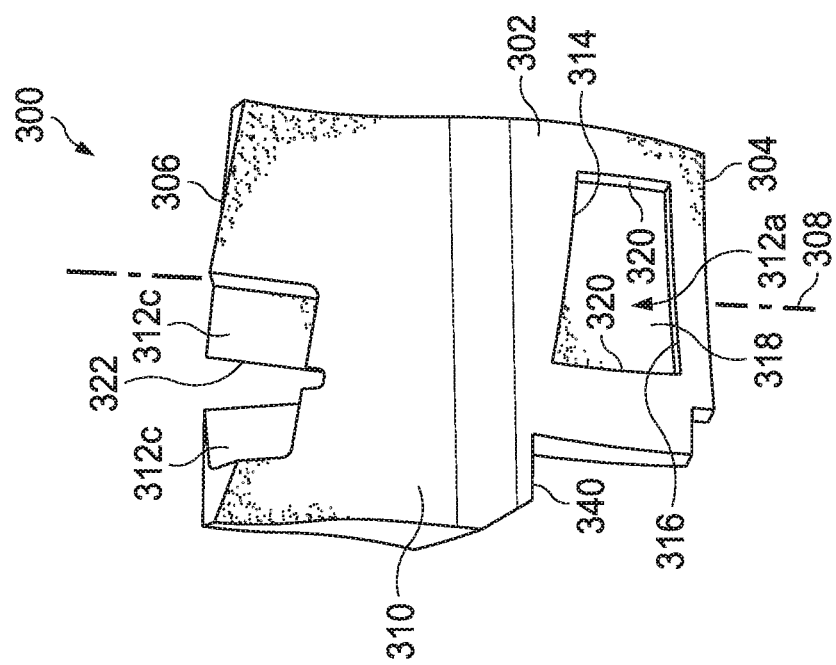
Figure 6D:
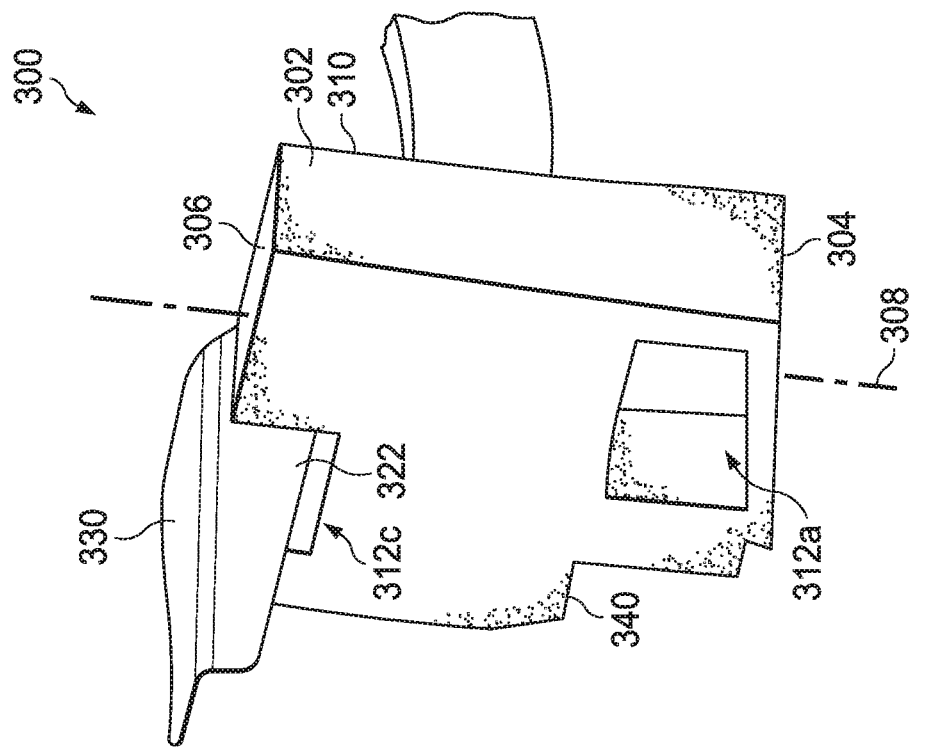
Figure 6C:
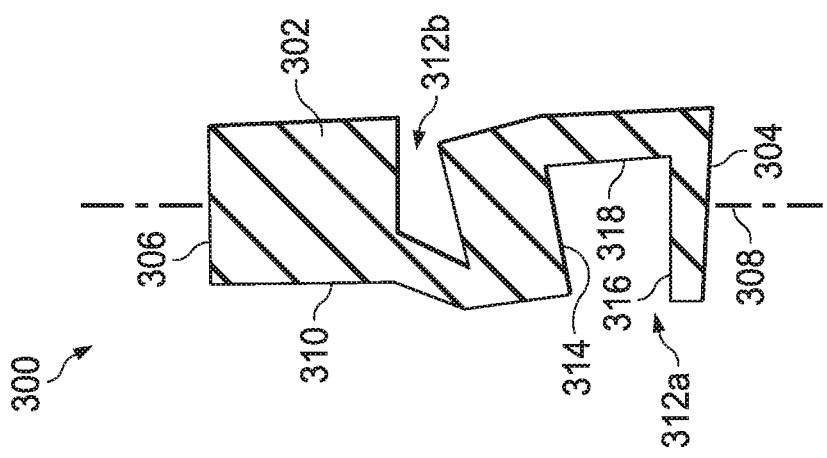

FIGS. 5A-5C show the example NV sealing block 200 during an impact event, according to at least one embodiment of the present disclosure. Multiple 3D shapes are identified herein that introduce cavities to the part in accordance with the present disclosure while still permitting it to serve its intended function as an NV sealing block. A person of ordinary skill in the art will appreciate that a large plurality of other such shapes exist, are within the scope of the present disclosure, and need not be individually or specifically elaborated herein. However, a number of specific examples will be shown in order to highlight specific principles of the present disclosure.

FIG. 5A is an exemplary representation of the engine compartment noise and vibration (NV) sealing block 200 in accordance with at least one embodiment of the present disclosure. In an example, the NV sealing block 200 sits adjacent to the bracket 220. In an example impact, the NV sealing block 200 is subject to an impact force 210 which deforms the NV sealing block 200. According to at least one embodiment of the present disclosure, the NV sealing block 200 includes one or more cutouts 260 that improve its ability to deform, and to absorb or dissipate energy during an impact event without substantially reducing its ability to seal against noise and vibration. In a vehicle-pedestrian collision wherein the pedestrian strikes the vehicle near the NV sealing block (e.g., near a rear corner of the vehicle's hood), such improved deformation may reduce the risk of injury (e.g., head injury criterion or HIC) to the pedestrian.

FIGS. 5A, 5B, and 5C shows the NV sealing block 200 in a compressed or crushed condition after an impact event (referenced as 200b) and also shows the uncrushed or natural condition (dashed lines, referenced as 200a) when the NV sealing block 200 is utilized prior to an impact event. When the NV sealing block 200 is properly situated between the hood and the support structure of the engine compartment, the NV sealing block is substantially in an uncrushed position, although some relatively small levels of loading may be present.

With reference to FIGS. 5A, 5B, and 5C, the NV sealing block 200 includes a body 222, formed as a block of compressible or semi-compressible material positionable between the vehicle hood and a support structure of the vehicle. The body 222 includes the attachment surface 224 configured to be secured to a portion of the vehicle, and an impact surface 226 configured to receive loading during an impact event. In some implementations, the impact surface 226 is disposed opposite the attachment surface 224. In the implementation shown in FIG. 3, the attachment surface 224 (not labeled in FIG. 3) is in contact with the supporting structure 206, and the impact surface 226 (not labeled in FIG. 3) is disposed opposite the attachment surface 224 and is configured to interface or to engage with the hood 152 during an impact event. In this implementation, the impact surface 226 is disposed vertically above the attachment surface 224. A longitudinal axis 228 may extend through the attachment surface 224 and the impact surface 226. In this example, the longitudinal axis 228 is a vertical axis that would also intersect with the supporting structure 206 and the hood 152. The body 222 also includes an exterior surface 230 that extends between the attachment surface 224 and the impact surface 226. The exterior surface 230 is an outwardly facing surface.

In the example described in FIG. 5A, the body 222 of the NV sealing block 200 also includes one or more cavities 260 or cutouts that improve its ability to deform, and to absorb or dissipate energy during an impact event without substantially reducing its ability to seal against noise and vibration. In some examples, the cavity 260 is formed in the exterior surface 230 and may be a depression, a concavity, a bore, or other shaped cavity that may improve the ability of the NV sealing block 200 to deform during an impact event. In the example shown in FIG. 5A, the cavity is a square-shaped depression formed in the exterior surface.

FIG. 5B shows the NV sealing block 200 with the cavity 260 in cross-section. As described with reference to FIG. 5A, the NV sealing block 200 is shown in both a crushed condition after an impact event and a natural working condition (uncrushed condition). As can be seen, the cavity 260 includes an upper inner surface 262, an opposing lower inner surface 264, and a back wall 266. The surfaces define the gap or the removed material from the body 222. Some implementations include inner side walls 268 such that the lateral inner side walls in combination with the upper inner surface 262 and lower inner surface 264 form the cavity 260 as an enclosed cavity, being enclosed on five sides. In some implementations, the surfaces are non-planar and may include curved transitions or may be formed of an arc having arc portion that forms the upper inner surface 262 and the lower inner surface 264 and any lateral side surfaces. As used herein the upper inner surface 262 and the lower inner surface 264 need not be horizontal surfaces, but may generally face upward or downward within the cavity. Accordingly, in some implementations, the cavity may be shaped as a side-ways V with the arms of the V-shape forming the upper inner surface 262 and the lower inner surface 264. In some implementations, the surfaces are not consistent from one end of the cavity 260 to another. The cavity 260 may have a width and height to provide the relief desired, and in some embodiments, may include a width greater than or equal to half a width of the body. FIG. 5C shows a planar cross-section of the NV sealing block 200.

In an example impact, the bracket 220 is shown in a compressed or crushed condition after an impact event (referenced as 220b) and also shows the uncrushed or natural condition (dashed lines, referenced as 220a). Accordingly, the NV sealing block 200 has a first height H1 in its natural state and a second lower height H2 in its compressed state (FIG. 5C). The shape of the NV sealing block 200 is shaped to partially or substantially accommodate the lateral deformation of the bracket 220. That is, the bracket deformation may cause an overlap in the positions of the NV sealing block 200 and the bracket 220, wherein a portion of the deformed bracket enters the empty space or cavity 260 within the NV sealing block 200 defined by one or more cavities 260. For higher force impacts, physical contact may still occur between the bracket 220 and the NV sealing block 200, but the resulting contact side force 250 may be substantially less than the contact force 145 described with reference to FIG. 1. This reduced contact side force 250 may permit greater deformation and energy absorption/dissipation of the NV sealing block 200, thus further decreasing the risk of injury to the pedestrian with whom the vehicle has collided. For lower force impacts, physical contact between the bracket 220 and the NV sealing block 200 may be avoided altogether, in which case the contact side force 250 may be approximately zero.

In an example, the shape of the NV sealing block 200 is such that it experiences impact compression forces at two different times—an earlier impact force 210, and a later (and likely smaller) impact force 270. This is because the impact surface 226 includes two surfaces. The first having a first height H3 and the second having a second shorter height H4. By distributing the impact over both time and space in this manner, the example NV engine sealing block 200 improves its absorption and dissipation of kinetic energy. Accordingly, the deformation, energy absorption, and energy dissipation properties of the vehicle are improved vs. a similar vehicle incorporating a conventional NV sealing block 100 as shown for example in FIG. 1.

In some examples, the NV sealing block 200 is formed of a compressible material, such as a foam material. In some implementations, the NV sealing block 200 is formed of a reversibly-compressible closed-cell foam (e.g., 95-100% reversible), although open-celled foams and irreversibly compressible foams (e.g., expanded polystyrene) may be used. In some embodiments, the sealing block 200 may be made from a less dense foam than the sealing block 100 of FIG. 1. This reduction in foam density allows the NV sealing block 200 to be more compliant. In an example, the foam includes no coatings, although the manufacturing process may leave a thin skin of un-foamed material at the surface of the foam.

In the example shown in FIGS. 5A-5C, the NV sealing block 200 can be seen in its deformed state 200b and its un-deformed state 200a, from two different angles and in cross-section. The bracket 220 can similarly be seen in its deformed state 220b and its un-deformed state 220a. As can be seen in the Figures, the cutout or cavity 260 within the NV sealing block 200 (e.g., a foam block) reduce the amount of material in the NV sealing block 200, thus making it easier to crush or deform with vertical force and thereby permitting it to absorb and/or dissipate energy more efficiently. At the same time, in this example the cutout or cutouts 260 permit the fender bracket 220 to transform during an impact event from an example un-deformed state 220a to an example deformed state 220b, without contacting or with reduced contact with the NV sealing block 200 as the NV sealing block transforms from its own example un-deformed state 200a to an example deformed state 200b. The lack of contact in this example means that no or a reduced side force 250 will be generated between the bracket 220 and the NV sealing block 200. Such side force 250 may tend to increase the stiffness or decrease the vertical compressibility of the NV sealing block 200, so the reduction or elimination of the side force 250 may tend to improve (i.e., reduce) the risk of injury (e.g., head injury criterion or HIC) to a pedestrian 350 during a vehicle-pedestrian collision.

FIGS. 6A-6D show another example of an NV sealing block, referenced herein by the numeral 300. The NV sealing block 300 is shown during an impact event, according to at least one embodiment of the present disclosure. Similar to the NV sealing block 200, the NV sealing block 300 includes a body 302, an attachment surface 304, an impact surface 306 disposed opposite the attachment surface 304, a longitudinal axis 308 which may be a vertical axis, and an exterior 310 as an outwardly facing surface. In this example, cavities 312a, 312b, and 312c allow the NV sealing block 300 to "fold" in the direction of a vertical load. The cavity 312a for example includes an upper inner surface 314, an opposing lower inner surface 316, and a back wall 318, inner side walls 320 that together form an enclosed cavity.

In this embodiment, the cavity 312b is formed in the body 302 on a side opposite that of the cavity 312a. The cavity 312b may include the same inner surfaces as the cavity 312a, and they will not repeated here. However, the cavity 312b may be disposed axially along the longitudinal axis 308 such that the cavities 312a and 312b are axially spaced apart, and in some implementations are directly vertically spaced apart. As can be seen, the cavity 312a and 312b are different sizes, with cavity 312a having a greater height and cavity 312b having a greater length. The size and shape of each cavity may differ as desired to provide desired collapsing capabilities. The nature of a plurality of cavities on opposing sides of the body 302 may permit the NV sealing block 300 to crush vertically with suitable compressive capacity. Furthermore, in some instances, the back walls of the cavity may operate as hinges allowing the NV sealing block 300 to crush with decreased resistance in the event of a contact event.

This example includes the cavity 312c that is sized, shaped, and positioned with a slot 322 to accommodate a hood hinge arm 330 such that contact between the hood hinge arm 330 and the NV sealing block 300 is minimized, and such that the NV sealing block 300 may more easily deform in this area. In this example, the cavity 312c includes a three-sided cavity (two lateral inner-facing sides and a lower inner surface) without the upper inner surface. The slot 322 is a vertical slot extending in the axial direction from the impact surface 306 toward the attachment surface 304, and in this example, may end at or adjacent the lower inner surface of the cavity 312c. Here, the cavity 312c also has a reduced thickness through the body, with the slot 322 extending centrally therethrough. The hood hinge arm 330 may be secured to a bottom of the hood in the upper corner of the engine compartment described with reference to FIG. 2. Because of this, during an impact event the hood hinge arm 330 may be able to travel vertically downward with less resistance because of the slot 322 and the decreased material of the NV sealing block 300.

The embodiment of the NV sealing block 300 also includes a shoulder 340 projecting from a main portion of the body 302. In some implementations, the shoulder 340 is formed in part below the slot 322 allowing the block to more easily crumble during an impact event. In some implementations, this may also accommodate other features of the vehicle supporting structure 206, such, as for example a cowl louver. Because of this the surface area of the attachment surface 304 is different than the surface area of the impact surface 306. Here, the area of the attachment surface is smaller than the area of the impact surface. This may allow the NV sealing block 300 to collapse in a manner causing the body 302 to collapse unevenly to a side during a compression load from an impact event.

FIGS. 7A, 7B, and 7C show another example NV sealing block, referenced herein by the numeral 400. The NV sealing block 400 is shown during an impact event, according to at least one embodiment of the present disclosure. Similar to the other NV sealing blocks described herein, the NV sealing block 400 includes a body 402, an attachment surface 404, an impact surface 406 disposed opposite the attachment surface 404, a longitudinal axis 408 which may be a vertical axis, and an exterior surface 410 as an outwardly facing surface. As best seen in FIG. 7A, this example includes a cavity 412 that may allow the NV sealing block 300 to "fold" in the direction of a vertical load. A shoulder 414 may be disposed below or axially displaced from the cavity 412. Similarly, the cavity 412 may include a slot 416 that accommodates the hood hinge arm 330.

This example also includes one or more sealing flaps 440 instead of or in addition to the cavity or cavities 412 and the slot 416 described hereinabove.

Referring to FIG. 7A, the height h of the foam NV sealing block 400 may be determined by the amount that the hood 152 (FIG. 2), hinge arm 330, and other components will crush, deform, or move in this area during an impact event, such as a pedestrian impact scenario. In an example, the hood 152 and hinge arm 330 contact the NV sealing block 400 but do not significantly deform it for some simulated impacts at 25 miles per hour (40 kph) with a pedestrian of mass 4.5 kg. In the same example, for some simulated impacts at 25 miles per hour (40 kph) with a pedestrian of mass 4.5 kg, the hood 152 and/or hinge arm 330 contact the sealing block 400 and compress it by 20 mm.

In the example shown in FIGS. 7A and 7B, the hood hinge arm 330 has an example un-deformed state 430a and an example deformed state 430b (FIG. 7B). In an example, neither the un-deformed state 430a nor the deformed state 430b cause significant deformation of the NV sealing block 400. In the example shown, the NV sealing block 400 includes a cavity as the slot 416 for the hood hinge arm 330, although this is not required if the height h is selected to minimize deformation of the NV sealing block 400 during a pedestrian impact event.

Figure 8:
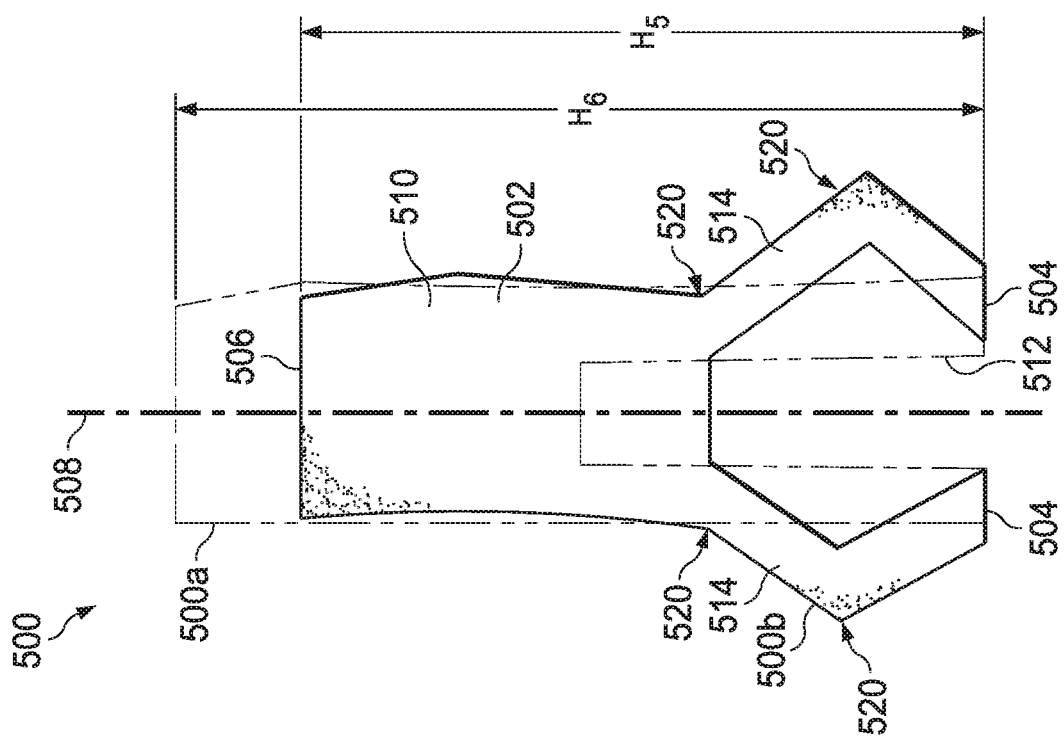
FIG. 8 shows an example NV sealing block during an impact event, according to at least one embodiment of the present disclosure.

In the example shown in FIGS. 7A-7C, the NV sealing block 400 includes at least one upper sealing flap 440, which are sized, shaped, and located to interface with the hood 152 and hood hinge arm 330 to provide a good seal against noise and vibration by preventing or reducing the escape of engine compartment air flow through exit points from the engine compartment as described herein. In some implementations, the NV sealing block 400 includes two upper sealing flaps 410, one on each side of the slot 416. During an impact event, such as a pedestrian impact (e.g., a head impact), as the hood and other components crush in this area, the sealing flaps 410 readily deform while the body 402 of the NV sealing block 400 does not necessarily deform significantly, or alternatively, the sealing flaps 410 readily deform first, followed by the deformation of the body 402 of the NV sealing block 400. The stiffness of the flaps 440 is selected such that the NV sealing block 400 which includes the flaps 440 does not provide substantial resistance to the deformation of the hood 152, hood hinge arm 330, or other components that may exist in this area (e.g., a rear corner of the engine compartment 154). This lack or relative lack of resistance may provide improved performance (i.e., reduced risk or severity of injury such as head injury criterion) during a vehicle-pedestrian collision where the pedestrian (e.g., the pedestrian's head form) collides with the hood 152 at a point over or near the NV sealing block. In some examples, the width W1 of the flap 440 is less than about a third of the thickness or the width W2 of the body 402. Other widths are contemplated and a flap may be any suitable thickness that permits it to FIG. 8 shows an example NV sealing block 500 in a natural condition 500a and during an impact event 500b, according to at least one embodiment of the present disclosure. Similar to the other NV seals described herein, the NV sealing block 500 includes a body 502, an attachment surface 504, an impact surface 506 disposed opposite the attachment surface 504, a longitudinal axis 508 which may be a vertical axis, and an exterior surface 510 as an outwardly facing surface. This example includes a cavity 512 formed between two extending arms or pillars 514 that serve to block or reduce airflow through the engine compartment as described herein. The arms or pillars 514 may be vertical when in a non-impact event, as shown by the natural condition 500a. However, the arms or pillars may deform or collapse during an impact event as shown at 500b. Accordingly, the NV sealing block 500 has a height H6 in the natural condition and height H5 in the compressed condition. In this example, the NV sealing block 500 includes one or more hinge areas 520 that may guide the vertical displacement during an impact event. Here, the hinge areas 520 are disposed along the arms or pillars 514, and the size of the cavity 512 may change as the arms or pillars expand due to the downward movement of the NV sealing block 500. The hinge areas 520 may be mechanical hinges or locations where stresses concentrate such that the material of the NV sealing block 500 (e.g., foam) deforms more readily and more substantially than at other locations within the NV sealing block (e.g., a foam block). This deformation may be aided by mechanical alterations to the NV sealing block material in the locations of the hinge areas 520. These alterations may include, for example only, slits, slots, grooves, notches, through-holes, or material differences including but not limited to a softer, more flexible, or more compressible foam, or a flexible adhesive joining two or more pieces to form the NV seal.

As a result of the hinge areas 520, the deformation of the NV sealing block 200 may occur predominantly as deflections at these hinge areas. The design of the NV sealing block 200 may be such that deflection of the NV sealing block 200 is reversible and does not interfere with the sealing properties of the NV sealing block against noise and vibration. Depending on the implementation, the NV sealing block 200 may additionally include one or more additional cavities or one or more flaps 440, although this is not required.

With the hinge areas 520 included in the NV sealing block 200, the NV sealing block 200 deforms readily when subjected to a vertical force 210 (e.g., an impact force generated by a vehicle-pedestrian collision). This permits the NV sealing block 500 to deform more substantially than an existing NV sealing block 100, while offering substantially reduced stiffness or resistance to the deformation of the hood 152 and hood hinge arm 330. This reduced resistance may in turn lead to reduced risk or severity of pedestrian injury (e.g., head injury criterion or HIC) in a vehicle-pedestrian impact wherein the pedestrian 350 contacts the hood in the vicinity of the NV sealing block 500.

Figure 9:
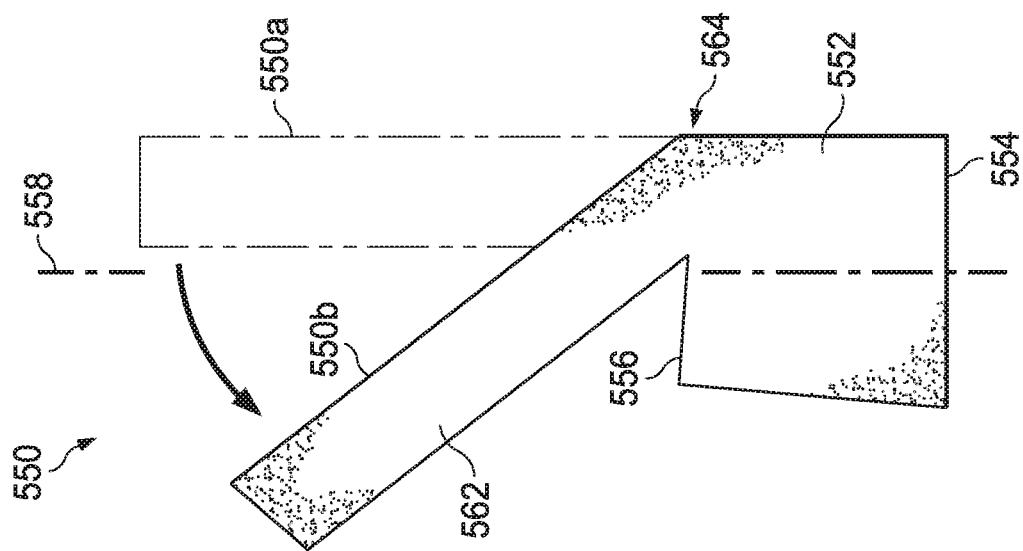
FIG. 9 shows an example NV sealing block during an impact event, according to at least one embodiment of the present disclosure.

FIG. 9 shows an alternative example NV sealing block 550 in a natural condition 550a and during an impact event 550b, according to at least one embodiment of the present disclosure. Similar to the other NV seals described herein, the NV sealing block 550 includes a body 552, an attachment surface 554, an impact surface 556 disposed opposite the attachment surface 554, a longitudinal axis 558 which may be a vertical axis, and an exterior surface 560 as an outwardly facing surface. This example includes a foldable flat 562 that may include a flexible hinge 564 as described herein, including, in some examples, the mechanical alterations described herein.

FIG. 10 is a graphical representation of the acceleration forces of a pedestrian head form during an example impact event near an NV sealing block in accordance with at least one embodiment of the present disclosure. In the example shown in FIG. 10, a graph of acceleration (measured in Newtons) vs. time (measured in seconds) is presented for an example pedestrian head form in an example vehicle-pedestrian collision. As can be seen in FIG. 10, the curve 1320 for a pedestrian head form 355 colliding with a vehicle hood 152 in the vicinity of an NV sealing block 100 of traditional design (e.g., a monolithic foam block) shows substantially increased impact acceleration vs. the curve 1310 for the NV sealing block shown in FIGS. 7A-7C. Thus, it can be seen that the introduction of NV sealing blocks 100 to reduce cabin noise and vibration created a potentially deleterious effect on head form accelerations that may be improved (i.e., through smaller acceleration increases) via the present disclosure.

Figure 11:
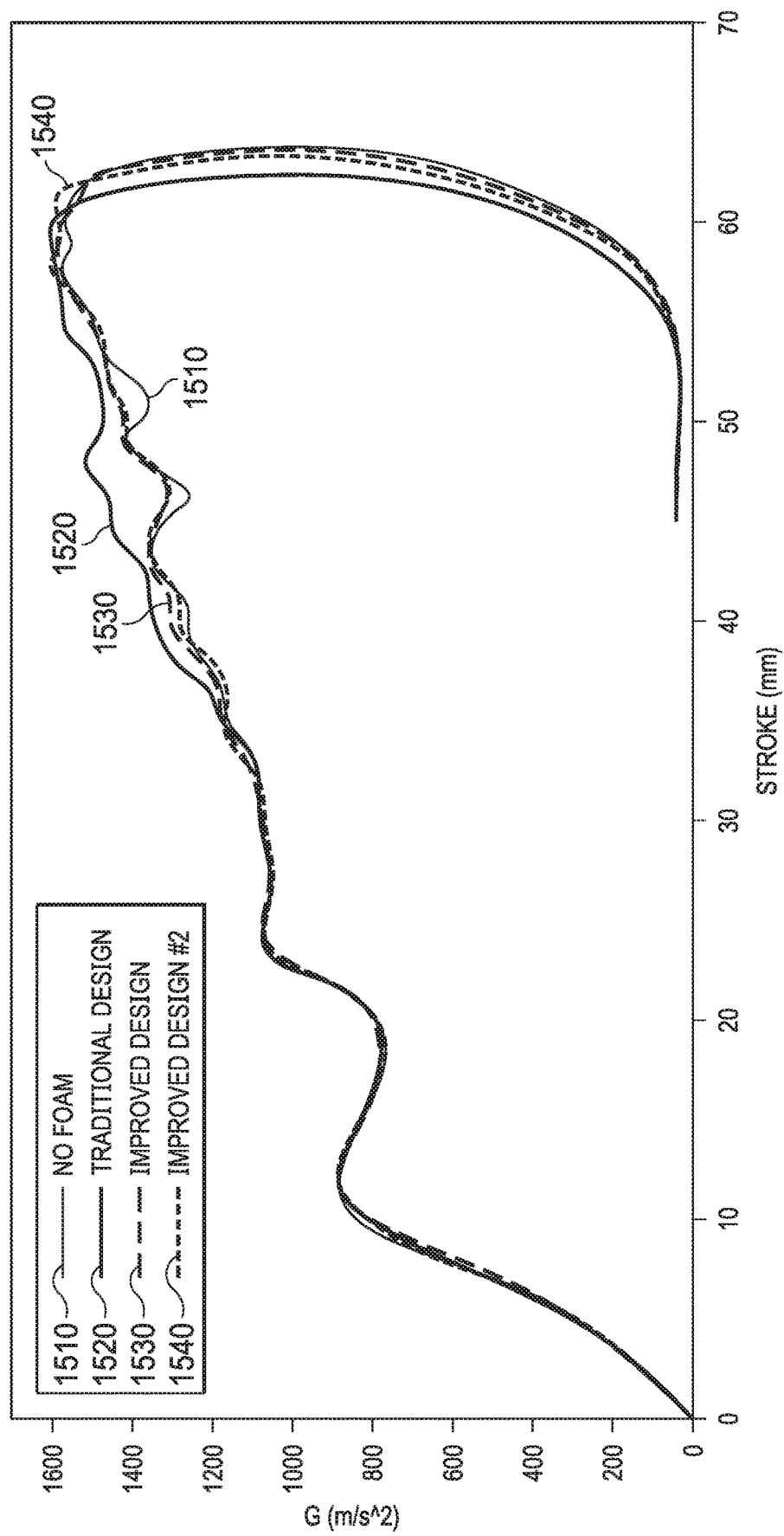
FIG. 11 is a graphical representation of the acceleration forces of a pedestrian head form during an example impact event near an NV sealing block in accordance with at least one embodiment of the present disclosure.

FIG. 11 is a graphical representation of the acceleration forces of a pedestrian head form during an impact event near an NV sealing block in accordance with at least one embodiment of the present disclosure. The graph depicted in FIG. 11 shows example head form acceleration (measured in $m/s^2$) vs. stroke (measured in millimeters), i.e., vs. the amount of movement experienced by the head 355, which is equal to the amount of deflection experienced by the vehicle hood 152 for the same example vehicle-pedestrian collision depicted in FIG. 10. In this example, the vehicle hood makes contact with the traditional NV sealing block 100 at a stroke or hood deflection of approximately 37 mm, the NV head form 355 reaches maximum acceleration at a stroke or hood deflection of approximately 49 mm, and the NV sealing block 100 reaches maximum compression at a stroke or hood deflection of approximately 57 mm, after which curves 1510 and 1520 are substantially similar.

Between the hood deflections of 37 mm and 57 mm, curve 1520 exhibits larger values than those of curve 1510, with a peak difference of approximately 200 m/s2. By comparison, curves 1520 and 1530 (representing embodiments of the present disclosure) exhibit a peak difference of approximately 85 m/s2. This reduction in acceleration differences can be equated to a reduction in the risk or severity of pedestrian injury, as shown for example in Table 1:

TABLE I

| Noise/Vibration Seal Type | Head Injury Criterion |
|---|---|
| No seal | 1796 |
| Traditional foam block | 1834 |
| NV sealing block 200 in FIGS. 5A-5C | 1799 |
| NV sealing block 400 in FIGS. 7A-7C | 1811 |

As can be seen in the table, in an example vehicle-pedestrian impact, NV seals designed in accordance with the present disclosure result in pedestrian head injury criterion (HIC) only 0.17% and 0.83% larger (i.e., worse) than the HIC for a vehicle with no NV sealing block at all, whereas a traditional foam block NV sealing block in accordance with the related art yields a HIC that is 2.1% worse than the HIC for no seal at all.

The studies shown in FIGS. 10 and 11 demonstrate that NV seals made in accordance with the present disclosure deform well enough that the head form acceleration is minimally affected by the presence of the NV seal, whereas traditional foam block NV seals result in larger accelerations. The improved foam designs have noise and vibration harshness (NVH) attenuation performance that may be comparable to (or in some cases, better than) traditional designs, with more accommodation during pedestrian impacts. Depending on the implementation, the size and placement of the cavities and features disclosed herein may be dependent on the packaging space of any foam or other materials used to form the NV seal, on the proximity of nearby brackets or deformable components, on the amount of deformation expected in the area near the NV seal, and other factors.

In some embodiments, the NV sealing blocks may also be made from a less dense foam than the sealing block 100 of FIG. 1. This reduction in foam density allows the NV sealing blocks described herein to be more compliant.

Figure 12:
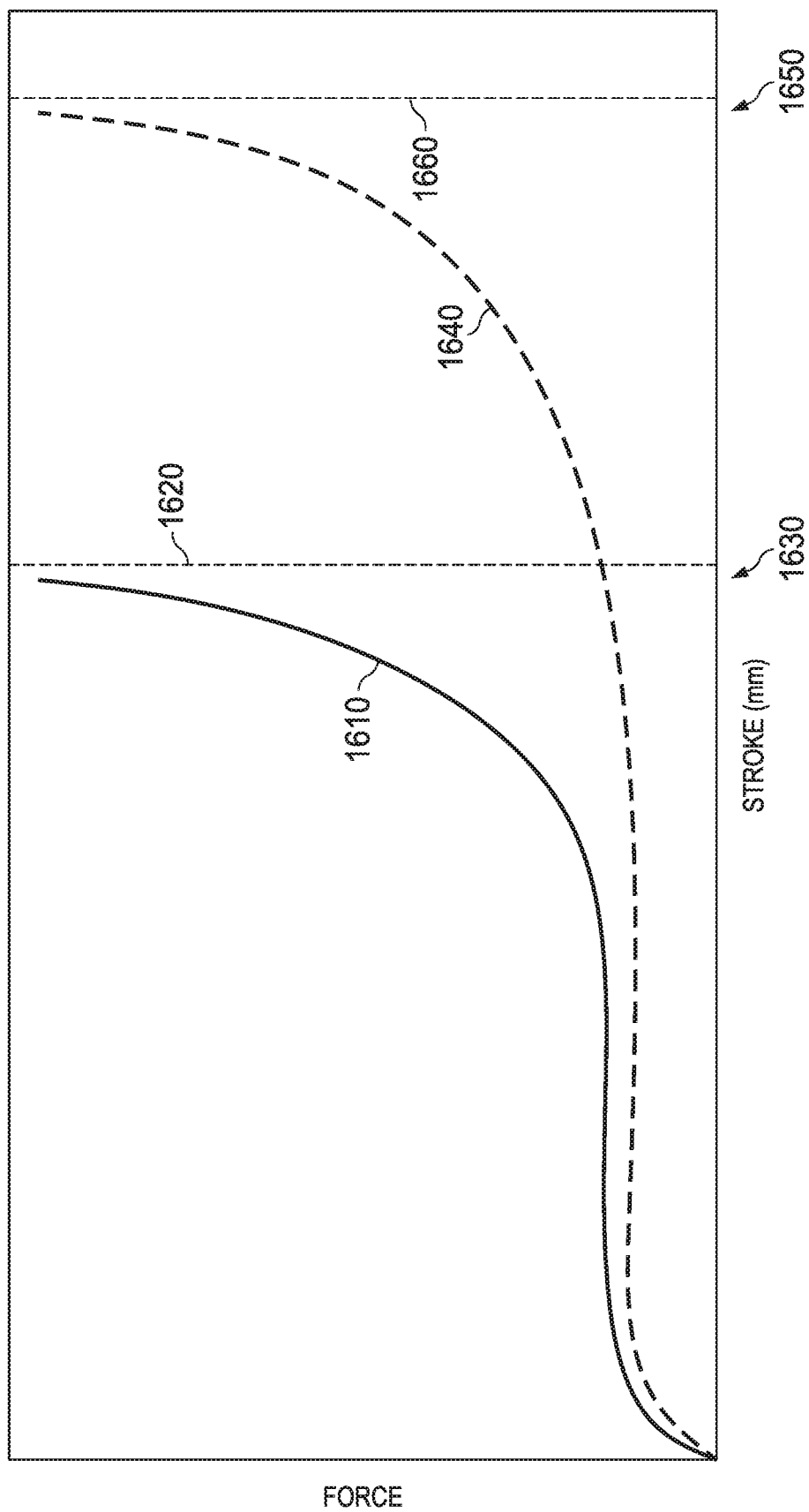
FIG. 12 is an idealized graphical representation of the physical response of an example foam block according to at least one embodiment of the present disclosure.

FIG. 12 is an idealized graphical representation of the physical response of an example NV sealing block according to at least one embodiment of the present disclosure. In a general sense, the force vs. stroke curve 1610 for a NV sealing block created according to the related art exhibits an exponentially rising value as the NV sealing block approaches its maximum stroke or maximum compression 1620, representing a condition wherein the cells within the NV sealing block have been flattened, and the flexible material of the NV sealing block has further compressed and widened to the maximum extent permitted by its molecular structure. This results in a stackup region 1630 wherein substantially greater force does not result in substantially greater stroke.

A NV sealing block created according to at least one embodiment of the present disclosure will include at least one of cutouts or cavities (including slot-shaped cutouts), flaps, hinges, and reduced overall foam density. These features, singly or in any of their possible combinations, have the effect of delaying stackup, such that the NV sealing block can experience substantially greater forces while continuing to compress (i.e., increase in stroke) as indicated by the line 1640. A stackup region 1650 may eventually occur as the foam structure approaches its maximum stroke or maximum compression 1660. A goal of some embodiments of the present disclosure is to cause the stackup region 1650 of the NV sealing block 200 to occur at forces greater than those that will occur during a plausible pedestrian impact scenario.

FIG. 13 is a diagrammatic representation of the geometry of an example foam block 600 according to the related art. A foam block 600 is fitted under the hood 152 and hood hinge arm 330, leaving gaps 1710a. Although the foam block may provide substantial noise and vibration suppression, some air may nevertheless escape through these gaps, carrying some amount of noise and vibration out of the engine compartment 154.

FIG. 14 is a diagrammatic representation of the geometry of an example NV sealing block 700 according to at least one embodiment of the present disclosure. A NV sealing block 700 is fitted under the hood 152 and hood hinge arm 330, leaving gaps 1710b. However, because the NV sealing block 200 is much more compliant than the NV sealing block 100 of FIG. 13, the gaps 1710b may be smaller than the gaps 1710a of FIG. 13, leading to better noise and vibration suppression than was previously possible. In some embodiments, the gaps 1710b are entirely absent. In some embodiments, greater compliance allows the total sealing area of an NV sealing block made according to the present invention to be larger than that of an NV sealing block made according to the related art.

This disclosure improves a traditional foam NV sealing block to allow easier deformation that may provide decreased acceleration to a head form. This disclosure also allows for the use of existing pedestrian protection designs, such as deformable brackets. The reaction of the head form, shown in FIGS. 10 and 11 as resultant acceleration (G) is notably reduced at 4-6 ms with two different implementations of the present disclosure. This data has been produced by a computer aided engineering simulations (CAE) solved by LS-Dyna. The results show at least one embodiment of the present disclosure to be nearly as effective as the no foam condition, HIC 1799 being only 3 points higher than HIC1796.

Depending on the implementation, NV sealing blocks made according to the present disclosure may achieve greater compliance by one or more cutouts, slots, flaps, hinges, and reduced foam density, which may allow the block of compressible material to crush or deform more efficiently along a direction of applied force expected during a pedestrian impact event. This greater compliance may help the NV sealing block to be more effective at reducing noise and vibration than a traditional NV engine seal, while also being substantially more compliant in a pedestrian collision. Accordingly, it can be seen that the deformable automotive noise and vibration seal for pedestrian protection fills a long-standing need in the art, by permitting noise, vibration, and pedestrian safety to be improved simultaneously, in accordance with customer demands, regulatory requirements, and liability imperatives.

A number of variations are possible on the examples and embodiments described above. For example, the placement of the NV engine seal may also be adjusted, such that interfering components (e.g., brackets and hinges) are located further from the NV engine seal and thereby cause less interference compression. In some instances, the component may be positioned through openings in the fender rather than sitting directly on the structure of the vehicle. In other instances, the NV engine seal may project upward through openings in the hood lower, and thus sit partially between the hood lower and the hood upper. The component could include cutouts, slots, hinges or flaps on its bottom surface. The component may be attached to hard surfaces of the vehicle with adhesives, or through a friction fit or interference fit, or by means of one or more pop clips or Christmas tree clips sitting partially in cylindrical holes positioned through the foam (e.g., drilled or formed). Other types of clips, bolts, or other fasteners could be used as well. A hood might include a damper stay to help the hood stay open, and/or structural bolts to hold various components in place, and the NV engine seal might be designed to fit around these.

The technology described herein may be produced by a variety of different methods, including cutting NV sealing block forms from a larger block of foam, machining, molding, or otherwise shaping the NV sealing blocks. In some implementations, the NV sealing block may be made from materials other than foam (e.g., low-density wood, plastic forms, or rubber forms) while remaining within the scope of the present disclosure. The logical operations making up the embodiments of the technology described herein are referred to variously as operations, steps, objects, elements, components, or modules. It should be understood that these may be performed in any order, unless explicitly claimed otherwise or a specific order is inherently necessitated by the claim language.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the deformable automotive noise and vibration seal for pedestrian protection. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the deformable automotive noise and vibration seal for pedestrian protection as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system for noise and vibration sealing of a vehicle with low impact resistance, comprising:
   a block of compressible material positionable between a vehicle hood and a support structure of the vehicle, the block of compressible material comprising:
   an attachment surface positioned at a bottom of the block and configured to be secured to a portion of the vehicle;
   an impact surface formed opposite the attachment surface at a top of the block, the impact surface being positioned in the vehicle to be contacted by the hood or support structure during an impact event;
   an exterior surface extending between the attachment surface and the impact surface; and
   a cavity formed in the exterior surface, the cavity having a first inner surface and a second inner surface opposing the first inner surface, the cavity being shaped to accommodate crushing of the block of compressible material during the impact event.

2. The system of claim 1, comprising a vehicle support bracket disposed adjacent the block of compressible material, the vehicle support bracket being configured to deform in a lateral direction during the impact event, the support bracket being disposed to enter the cavity during the impact event.

3. The system of claim 1, comprising a flap extending from the impact surface and being configured to interface with one of the hood and the support structure of the vehicle to reduce wind flow through the vehicle.

4. The system of claim 1, wherein the cavity is formed by the first inner surface, the second inner surface, and at least one lateral side surface.

5. The system of claim 1, wherein the cavity is disposed by formed by the first inner surface the second inner surface, and at least two lateral side surfaces.

6. The system of claim 1, wherein the cavity is a first cavity and comprises an opening, and wherein the block comprises a second cavity formed in the exterior surface, the second cavity having an opening facing away from the opening of the first cavity.

7. The system of claim 6, wherein the second cavity is disposed above the first cavity when the block is disposed on the vehicle.

8. The system of claim 1, wherein the cavity has width greater than or equal to half a width of the block.

9. The system of claim 1, comprising a vertically extending slot shaped to accommodate a hinge of a hood.

10. The system of claim 1, wherein the cavity is formed between substantially parallel arms configured to collapse during the impact event.

11. A system for noise and vibration sealing of a vehicle, comprising:
    a block of compressible material positionable between a vehicle hood and a support structure of the vehicle, the block of compressible material having a block width and a block length, comprising:
    an attachment surface positioned at a bottom of the block and configured to be secured to a portion of the vehicle;
    an impact surface formed opposite the attachment surface at a top of the block, the impact surface being positioned in the vehicle to be contacted by the hood or support structure during an impact event;
    an exterior surface extending between the attachment surface and the impact surface; and
    a flexible sealing flap extending from the impact surface, the sealing flap having a flap width smaller than the block width and configured to fold or bend before substantial deformation of the block during the impact event.

12. The system of claim 11, comprising a vertically extending slot shaped to accommodate a hinge of a hood, the vertically extending slot being adjacent the flexible sealing flap.

13. The system of claim 11, wherein the block comprises a cavity formed in the exterior surface, the cavity having a first inner surface and a second inner surface opposing the first inner surface, the cavity being shaped to accommodate crushing of the block of compressible material during the impact event.

14. The system of claim 13, comprising a vehicle support bracket disposed adjacent the block of compressible material, the vehicle support bracket being configured to deform in a lateral direction during the impact event, the support bracket being disposed to enter the cavity during the impact event.

15. The system of claim 13, wherein the cavity is formed by the first inner surface, the second inner surface, and at least one lateral side surface.

16. The system of claim 13, wherein the cavity is a first cavity and comprises an opening, and wherein the block comprises a second cavity formed in the exterior surface, the second cavity having an opening facing away from the opening of the first cavity.

17. The system of claim 13, wherein the block comprises a flexible back portion forming an inner wall of the cavity, the flexible back portion extending from the cavity to the exterior surface.

18. A method of improving pedestrian impact properties of a vehicle noise and vibration seal, comprising:
   securing an attachment surface of a block of compressible material between a vehicle hood and a support structure of the vehicle in a location preventing air flow from between the hood and a windshield of the vehicle, the block comprising:
   an impact surface formed opposite the attachment surface, the impact surface being positioned in the vehicle to be contacted by the hood or support structure during an impact event;
   an exterior surface extending between the attachment surface and the impact surface; and
   a cavity formed in the exterior surface, the cavity having a first inner surface and a second inner surface opposing the first inner surface, the cavity being shaped to accommodate crushing of the block of compressible material during the impact event,
   wherein the attachment surface is positioned at a bottom of the block, and
   wherein the impact surface is positioned at a top if the block.

19. The method of claim 18, comprising:
   in response to an impact event on the hood, receiving a portion of a collapsing bracket into the cavity.

20. The method of claim 18, comprising:
   in response to an impact event on the hood, folding a flexible sealing flap extending from the impact surface before substantial collapsing of the block due to the cavity.

* * * * *